(12) United States Patent
Blanchard et al.

(10) Patent No.: US 6,355,220 B1
(45) Date of Patent: *Mar. 12, 2002

(54) METHOD FOR TREATING EXHAUST GAS OF INTERNAL COMBUSTION ENGINES FUNCTIONING WITH SULPHUR-CONTAINING FUEL

(75) Inventors: Gilbert Blanchard, Lagny le Sec; Valérie Visciglio, Paris, both of (FR)

(73) Assignee: Rhodial Chimie, Boulogne Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/331,474

(22) PCT Filed: Dec. 18, 1997

(86) PCT No.: PCT/FR97/02351

§ 371 Date: Feb. 2, 2000

§ 102(e) Date: Feb. 2, 2000

(87) PCT Pub. No.: WO98/28063

PCT Pub. Date: Jul. 2, 1998

(30) Foreign Application Priority Data

Dec. 23, 1996 (FR) .............................. 96 15836

(51) Int. Cl.[7] ........................ C01B 17/00; C01B 31/00; B01J 8/00; B01J 23/00
(52) U.S. Cl. .............................. 423/242.1; 423/213.2; 423/239.1; 502/302; 502/303; 502/304; 502/349
(58) Field of Search ................. 502/303, 304, 502/302, 349; 423/239.1, 242.1, 213.2

(56) References Cited

U.S. PATENT DOCUMENTS 4,868,148 A * 9/1989 Henk et al. ................. 502/303
5,672,557 A * 9/1997 Williamson et al. ........ 502/303

FOREIGN PATENT DOCUMENTS

| | | | | |
|---|---|---|---|---|
| DE | 3913972 A1 | * 11/1989 | ............ | B01J/23/10 |
| EP | 0385123 A2 | * 9/1990 | ............ | B01D/3/36 |
| EP | 0525677 A1 | * 2/1993 | ............ | B01D/53/36 |
| FR | 2570087 A1 | * 3/1986 | ............ | C25D/11/02 |
| FR | 0605274 A | * 7/1994 | ............ | C01G/25/00 |
| FR | 0611192 A1 | * 8/1994 | ............ | C01G/25/00 |
| WO | WO9621506 | * 7/1996 | ............ | B01J/23/83 |
| WO | WO9730777 | * 8/1997 | ............ | B01D/53/94 |

* cited by examiner

Primary Examiner—Stuart L. Hendrickson
Assistant Examiner—Jonas N. Strickland
(74) Attorney, Agent, or Firm—Kevin E. McViegh

(57) ABSTRACT

The present invention relates to a process for the treatment of exhaust gases from internal combustion engines operating with a fuel containing sulphur. This process is characterized in that use is made, as catalyst, of a composition based on a cerium oxide and on a zirconium oxide, in a cerium/zirconium atomic proportion of at least 1, and on at least one oxide chosen from yttrium, lanthanum and praseodymium oxide and which exhibits a specific surface, after calcination for 6 hours at 900 ° C., of at least 35 $m^2/g$.

24 Claims, No Drawings

METHOD FOR TREATING EXHAUST GAS OF INTERNAL COMBUSTION ENGINES FUNCTIONING WITH SULPHUR-CONTAINING FUEL

This application is an application under 35 U.S.C. Section 371 of International application No. PCT/FR97/02351, filed on Dec. 18, 1998.

The present invention relates to a process for the treatment of exhaust gases from internal combustion engines operating with a fuel containing sulphur.

So-called multifunctional catalysts are currently used for the treatment of exhaust gases from internal combustion engines (automobile afterburning catalysis). Multifunctional catalyst is understood to mean catalysts capable of carrying out not only oxidation, in particular of carbon monoxide and hydrocarbons present in exhaust gases, but also reduction, in particular of nitrogen oxides also present in these gases ("three-way" catalysts). Zirconium oxide and cerium oxide today appear as two constituents which are particularly important and advantageous for this type of catalyst.

To be effective, these catalysts must first of all exhibit a high specific surface, even at high temperature. In addition, it is known that cerium makes it possible to ensure a buffering power with respect to variations in the oxygen content of the gas mixture to be treated and thus makes it possible to improve the performance of the catalyst with respect to the three main pollutants, namely CO, HC and $NO_x$. This buffering power is evaluated by the capacity to store oxygen in an oxidizing environment and to restore it in a reducing environment. However, this oxygen storage capacity greatly decreases when the catalyst operates in a medium containing sulphur-containing compounds. Thus it is that some catalysts can prove to be inefficient when they are used in the treatment of exhaust gases from engines operating with fuels laden with sulphur-containing compounds.

The object of the invention is thus the development of a catalytic composition with an oxygen storage capacity which remains at an acceptable value in the case of the use of such fuels.

With this aim, the process according to the invention for the treatment of exhaust gases from internal combustion engines operating with a fuel containing sulphur is characterized in that use is made, as catalyst, of a composition based on a cerium oxide and on a zirconium oxide, in a cerium/zirconium atomic proportion of at least 1, and on at least one oxide chosen from yttrium, lanthanum and praseodymium oxide and which exhibits a specific surface, after calcination for 6 hours at 900° C., of at least 35 $m^2/g$.

The invention also relates to a catalytic system for the treatment of exhaust gases from internal combustion engines operating with a fuel containing sulphur which is characterized in that it comprises a composition of the abovementioned type.

Other characteristics, details and advantages of the invention will become still more fully apparent on reading the following description, as well as the various concrete but non-limiting examples intended to illustrate it.

The compositions which can be used in the context of the process of the invention will now be described.

These compositions are based on a cerium oxide and on a zirconium oxide and on at least one oxide chosen from yttrium, lanthanum and praseodymium oxide. The cerium/zirconium atomic proportion is at least 1.

The compositions of the invention can correspond to the formula $Ce_xZr_yM_zO_2$ in which M represents at least one element chosen from the group comprising yttrium, lanthanum and praseodymium. In this formula, z is greater than 0 and preferably exhibits a value of at most 0.3 and which can more particularly be between 0.02 and 0.2. The x/y ratio can be between 1 and 19, more particularly between 1 and 9 and more particularly still between 1.5 and 4, the values of the limits, other than 0, being included and x, y and z being linked by the relationship $x+y+z=1$.

Another characteristic of the compositions of the invention is their specific surface. Thus, they exhibit a specific surface, after calcination for 6 hours at 900° C., of at least 35 $m^2/g$. This surface can more particularly be at least 40 $m^2/g$. It can more particularly still be at least 45 $m^2/g$.

The compositions of the invention can also exhibit surfaces which still remain significant even after calcination for 6 hours at 1000° C. These surfaces can be at least 14 $m^2/g$, more particularly at least 20 $^2/g$ and more particularly still at least 30 $m^2/g$.

The compositions of the invention can advantageously exist in the form of a solid solution. The X-ray diffraction spectra of these compositions in fact reveal, within the latter, the existence of a single homogeneous phase. For the compositions which are the richest in cerium, this phase corresponds in fact to that of a crystalline ceric oxide $CeO_2$, the unit cell parameters of which are more or less offset with respect to a pure ceric oxide, thus reflecting the incorporation of zirconium and, if appropriate, of the other element in the crystal lattice of the cerium oxide and thus the preparation of a true solid solution.

The process for the preparation of the compositions described above will now be described.

The first stage of the processing according to the invention consists in preparing a mixture in liquid medium, generally in the aqueous phase, containing at least one cerium compound, at least one zirconium compound and at least one yttrium, lanthanum or praseodymium compound. This mixture is prepared by using a zirconium solution.

This zirconium solution can originate from the attach of acid on a reactant comprising zirconium. Mention may be made, as an appropriate reactant, of zirconium carbonate, hydroxide or oxide. The attack can be carried out with an inorganic acid, such as nitric acid, hydrochloric acid or sulphuric acid. Nitric acid is the preferred acid and the use of a zirconyl nitrate originating from the attack of nitric acid on a zirconium carbonate may thus be very particularly mentioned. The acid can also be an organic acid, such as acetic acid or citric acid.

According to the invention, this zirconium solution must exhibit the following characteristic. The amount of base necessary to reach the equivalent point during an acid/base titration of this solution must confirm the condition that, as a molar ratio, $OH^-/Zr \leq 1.65$. More particularly, this ratio can be at most 1.5 and more particularly still at most 1.3. Generally, the specific surface of the composition obtained has a tendency to increase when this ratio decreases.

The acid/base titration is carried out in a known way. In order for it to be carried out under optimum conditions, a solution which has been brought to a concentration of approximately $3 \times 10^{-2}$ mol per litre, expressed as elemental zirconium, can be titrated. A1N sodium hydroxide solution is added thereto with stirring. Under these conditions, the equivalent point (change in the pH of the solution) is determined in a clear-cut way. This equivalent point is expressed by the $OH^-/Zr$ molar ratio.

Mention may particularly be made, as cerium compounds, of cerium salts such as cerium(IV) salts, such as nitrates or ceric ammonium nitrates for example, which are particularly well suited in this instance. Ceric nitrate is preferably used. The solution of cerium(IV) salts can contain cerium in the cerous state but is preferable for it to contain at least 85% of cerium(IV). An aqueous ceric nitrate solution can, for example, be obtained by reaction of nitric acid with a ceric oxide hydrate prepared conventionally by reaction of a solution of a cerous salt, for example cerous nitrate, and of an aqueous ammonia solution in the presence of hydrogen peroxide. Use can also be made of a ceric nitrate solution obtained according to the process of electrolytic oxidation of a cerous nitrate solution as described in the document FR-A-2,570,087, which can constitute an advantageous starting material.

It will be noted here that the aqueous solution of cerium (IV) salts can exhibit a degree of initial free acidity, for example a normality varying between 0.1 and 4N. According to the present invention, it is just as possible to use an initial solution of cerium(IV) salts effectively exhibiting a degree of free acidity as mentioned above as a solution which would have been neutralized beforehand more or less exhaustively by addition of a base, such as for example an aqueous ammonia solution or alternatively a solution of alkali metal (sodium, potassium and the like) hydroxides, but preferably an aqueous ammonia solution, so as to limit this acidity. It is then possible, in the latter case, to define in practice a degree of neutralization (r) of the initial cerium solution by the following equation:

$$r = \frac{n3 - n2}{n1}$$

in which n1 represents the total number of moles of Ce(IV) present in the solution after neutralization; n2 represents the number of moles of OH⁻ ions effectively necessary to neutralize the initial free acidity introduced by the aqueous cerium(IV) salt solution; and n3 represents the total number of moles of OH⁻ ions introduced by the addition of the base. When the "neutralization" alternative form is implemented, use is made in all cases of an amount of base which absolutely must be less than the amount of base which would be necessary to obtain complete precipitation of the hydroxide species $Ce(OH)_4$ (r=4). In practice, the limit is therefore set at degrees of neutralization which do not exceed 1 and preferably still do not exceed 0.5.

The yttrium, lanthanum or praseodymium compounds are preferably compounds which are soluble in water in particular.

Mention may be made, as yttrium, lanthanum or praseodymium compounds which can be used in the process of the invention, of, for example, the salts of inorganic or organic acids, for example of the sulphate, nitrate, chloride or acetate type. It will be noted that the nitrate is particularly well suited. These compounds can also be introduced in the form of sols. These sols can be obtained, for example, by neutralization by a base of a salt of these compounds.

The amounts of cerium, of zirconium and of yttrium, of lanthanum or of praseodymium present in the mixture must correspond to the stoichiometric proportions required in order to obtain the final desired composition.

The initial mixture thus being obtained, it is then heated in accordance with the second stage of the process according to the invention.

The temperature at which this heat treatment, also known as thermal hydrolysis, is carried out can be between 80° C. and the critical temperature of the reaction mixture, in particularly between 80 and 350° C. and preferably between 90 and 200° C.

This treatment can be carried out, according to the temperature conditions used, either at normal atmospheric pressure or under pressure, such as, for example, the saturated vapour pressure corresponding to the temperature of the heat treatment. When the treatment temperature is chosen to be greater than the reflux temperature of the reaction mixture (that is to say generally greater than 100° C.), for example chosen between 150 and 350° C., the operation is then carried out by introducing the aqueous mixture containing the abovementioned species into an enclosed space (closed reactor more commonly known as an autoclave), the necessary pressure then resulting only from the heating alone of the reaction mixture (autogenous pressure). Under the temperature conditions given above, and in aqueous medium, it is thus possible to specify, by way of illustration, that the pressure in the closed reactor varies between a value greater than 1 bar ($10^5$ Pa) and 165 bar ($165 \times 10^5$ Pa), preferably between 5 bar ($5 \times 10^5$ Pa) and 165 bar ($165 \times 10^5$ Pa). It is of course also possible to exert an external pressure which is then added to that resulting from the heating.

The heating can be carried out either under an air atmosphere or under an inert gas atmosphere, preferably nitrogen.

The duration of the treatment is not critical and can thus vary within wide limits, for example between 1 and 48 hours and preferably between 2 and 24 hours.

On conclusion of the heating stage, a solid precipitate is recovered which can be separated from its mixture by any conventional solid/liquid separation technique, such as, for example, filtration, settling, draining or centrifuging.

It may be advantageous, after the heating stage, to introduce a base, such as, for example, an aqueous ammonia solution, into the precipitation mixture. This makes it possible to increase the recovery yields of the precipitated species.

It is also possible, in the same way, to add hydrogen peroxide after the heating stage.

The product as recovered can then be subjected to washings with water and/or with aqueous ammonia, at a temperature between ambient temperature and the boiling temperature. In order to remove the residual water, the washed product can finally, optionally, be dried, for example in air, at a temperature which can vary between 80 and 300° C. and preferably between 100 and 150° C., drying being continued until a constant weight is obtained.

It will be noted that it is of course possible, after recovery of the product and optional addition of the base or of hydrogen peroxide, to repeat a heating stage as described above one or a number of times, in an identical or nonidentical way, by then again placing the product in liquid medium, in particular in water, and by carrying out, for example, heat treatment cycles.

In a last stage of the process, the recovered precipitate, optionally after washing and/or drying, is then calcined. According to a specific embodiment, it is possible, after the thermohydrolysis treatment and optionally after again placing the product in liquid medium and an additional treatment, directly to dry the reaction mixture obtained by atomization.

The calcination is carried out at a temperature generally of between 200 and 1200° C. and preferably between 300 and 900° C. This calcination temperature must be sufficient to convert the precursors to oxides and it is also chosen as a function of the temperature of subsequent use of the catalytic composition, it being taken into account that the specific surface of the product becomes smaller as the calcination temperature employed becomes higher. The duration of the calcination can, for its part, vary within wide limits, for example between 1 and 24 hours and preferably between 4 and 10 hours. The calcination is generally carried out under air but a calcination carried out, for example, under an inert gas is very clearly not excluded.

The compositions as described above or as obtained in the processes mentioned above are provided in the form of powders but they can optionally be shaped in order to be provided in the form of granules, balls, cylinders or honeycombs of variable sizes. These compositions can be applied to any support commonly used in the field of catalysis, that is to say in particular thermally inert substrates or supports. This support can be chosen from alumina, titanium oxide, cerium oxide, zirconium oxide, silica, spinels, zeolites, silicates, crystalline silicoaluminium phosphates or crystalline aluminium phosphates. The compositions can also be used in catalytic systems comprising a coating (wash coat), based on these compositions and with catalytic properties, on a substrate of the ceramic or metal monolith type, for example. The coating can itself also contain a support of the type of those mentioned above. This coating is obtained by mixing the composition with the support, so as to form a suspension which can subsequently be deposited on the substrate.

For this reason, the invention covers a catalytic system which is characterized in that it comprises a composition of the type described above and more particularly a system composed of a coating on a substrate, the said coating comprising the abovementioned composition.

The compositions of the invention can be employed in combination with precious metals. The nature of these metals and the techniques for the incorporation of the latter in these compositions are well known to a person skilled in the art. For example, the metals can be platinum, rhodium palladium or iridium and they can, in particular, be incorporated in the compositions by impregnation.

The compositions of the invention are particularly useful in the treatment of exhaust gases from internal combustion engines operating with a fuel containing sulphur, that is to say for fuels with a sulphur content of at least 30 ppm, more particularly of at least 50 ppm and more particularly still of at least 200 ppm (content expressed as elemental sulphur). The term sulphur must be understood within the broad sense, that is to say as denoting sulphur but also sulphur-containing compounds which are present in fuels. This is because it is observed that the compositions of the invention, used in combination with precious metals of the type described above and under the test conditions given below, generally exhibit an oxygen storage capacity of at least 4.5 ml $O_2$/g, more particularly of at least 5 ml $O_2$/g, and that they only undergo a decrease of at most 20% in this capacity after a heat treatment in the presence of sulphur, which is less than the decreases exhibited by the known catalysts.

Examples will now be given. Examples 1 to 4 describe the preparation of the products.

EXAMPLE 1

This example relates to a mixed oxide of formula $Ce_{0.645}Zr_{0.30}Y_{0.055}$.

A ceric nitrate solution preneutralized by addition of $NH_4OH$, such that r=−0.22 (r being as defined above), an yttrium nitrate solution and a zirconyl nitrate solution which corresponds, within the meaning defined above, to the molar ratio condition $OH^-/Zr=1.17$ are mixed in the stoichiometric proportions required to obtain the mixed oxide above.

The concentration of this mixture (expressed as oxide of the various elements) is adjusted to 80 g/l. This mixture is subsequently brought to 150° C. for 4 hours.

An aqueous ammonia solution is subsequently added to the reaction mixture so that the pH is greater than 8.5. The reaction mixture thus obtained is brought to boiling point for 2 hours. After separating by settling and then drawing off, the solid product is resuspended and the mixture thus obtained is treated for 1 hour at 100° C. The reaction mixture thus obtained is dried by atomization. Part of the dried product is calcinated at 900° C. for 6 hours. The calcined product obtained then exhibits a surface 47 $m^2$/g.

EXAMPLE 2

This example relates to a mixed oxide of formula $Ce_{0.65}Zr_{0.31}La_{0.04}O_2$.

The mixing of the solutions and the procedure followed are the same as in Example 1, the yttrium nitrate being replaced by lanthanum nitrate. The product, obtained after calcination at 900° C. for 6 hours, exhibits a surface of 44 $m^2$/g.

EXAMPLE 3

This example relates to a mixed oxide formula $Ce_{0.66}Zr_{0.30}Pr_{0.04}O_2$.

The mixing of the solutions and the procedure followed are the same as in Example 1, the yttrium nitrate being replaced by praseodymium nitrate. The product, obtained after calcination at 900° C. for 6 hours, exhibits a surface of 40 $m^2$/g.

COMPARATIVE EXAMPLE 4

This example relates to a mixed oxide of formula $Ce_{0.62}Zr_{0.38}O_2$.

A ceric nitrate solution and a zirconyl nitrate solution are mixed in the stoichiometric proportions required to obtain the mixed oxide above. The zirconyl nitrate solution was obtained by attack on a carbonate using concentrated nitric acid. The solution corresponds, within the meaning defined above, to the molar ratio condition $OH^-/Zr=0.94$.

The concentration of this mixture (expressed as oxide of the various elements) is adjusted to 80 g/l. This mixture is subsequently brought to 150° C. for 4 hours.

An aqueous ammonia solution is subsequently added to the reaction mixture so that the pH is greater than 8.5. The reaction mixture thus obtained is brought to boiling point for 2 hours. After separation by settling and then drawing off, the solid product is resuspended and the mixture thus obtained is treated for 1 hour at 100° C. The product is subsequently filtered off. Part of the product obtained after filtration is calcined at 900° C. for 6 hours. It then exhibits a surface of 39 $m^2$/g.

EXAMPLE 5

This example describes the measurement of the oxygen storage capacity of the products obtained according to the procedures given in Examples 1 to 4.

Preparation of the products

The other part of the product obtained on conclusion of the drying stages in Examples 1 to 3 and of the filtration stage in Example 4 is calcined at 650° C. for 2 hours. Platinum is subsequently deposited on the calcined product in the following way.

100 ml of a hexachloroplatinic acid solution containing 0.05 g of platinum are introduced into a beaker. 10 g of the calcined product above are added with stirring. After stirring for 3 hours, the solid is separated from the solution by centrifuging for 15 minutes. The platinum-impregnated product is subsequently dried at 120° C. for 12 hours and then calcined at 480° C. for 5 hours. The products obtained exhibit a platinum content of 0.5% by weight of metal with respect to the oxide.

The oxygen storage capacity is determined using aged products. Thus, the impregnated products are treated at 900° C. for 6 hours under an alternating oxidizing/reducing atmosphere in the presence of 10% of water and then, secondly, at 450° C. for 6 hours under an alternating oxidizing/reducing atmosphere in the presence of 10% of water and in the presence or absence of sulphur dioxide (150 ppm) in an oxidizing atmosphere.

Description of the test which makes it possible to quantify the oxygen storage

The buffering power of a composition with respect to oxygen is evaluated by its ability to store oxygen in an oxidizing environment and to restore it in a reducing environment. The test evaluates the ability of the composition to successively oxidize pulses of carbon monoxide with oxygen and to consume pulses of oxygen in order to reoxidize the composition. The method employed is known as alternating.

The carrier gas is pure helium at a flow rate of 10 l/h. Injections are made via a loop containing 16 ml of gas. The pulses of CO are produced by using a gas mixture containing 5% of CO diluted in helium, whereas the pulses of $O_2$ are produced from a gas mixture containing 2.5% of $O_2$ diluted in helium. The gases are analysed by chromatography using a thermal conductivity detector.

The amount of oxygen consumed or the proportion of CO converted makes it possible to determine the oxygen storage capacity (OSC) expressed as ml $O_2$/g. The oxygen storage power measurements are carried out at 400° C. on oxides which have been impregnated and aged according to the method which has been given above. The variation in oxygen storage power is expressed according to the following formula:

$$\Delta=100\ (OSC_1-OSC_2)\ /OSC_1$$

in which $OSC_1$ represents the OSC after heat treatment in the absence of sulphur and $OSC_2$ represents the OSC after heat treatment in the presence of sulphur.

The results with respect to the oxygen storage capacity are given in the following table. The products 1 to 4 correspond to the products prepared in the way in which has been described in Example 5 and resulting from the procedures of Examples 1 to 4 respectively.

| Products | $OSC_1$ 0 ppm $SO_2$ | $OSC_2$ 150 ppm $SO_2$ | Δ |
| --- | --- | --- | --- |
| 1 | 6 | 4.9 | 18 |
| 2 | 7.5 | 6.5 | 13 |
| 3 | 5.6 | 5.0 | 12 |
| 4 (comparative) | 7.8 | 4.3 | 45 |

What is claimed is:

1. A process for the catalytic treatment of exhaust gases from internal combustion engines operating with a fuel containing sulphur, comprising the steps of using, as catalyst, a composition comprising a cerium oxide and a zirconium oxide, in a cerium/zirconium atomic proportion of at least 1, said composition further comprising at least one oxide selected from the group consisting of yttrium oxide, lanthanum oxide and praseodymium oxide, and said composition exhibiting a specific surface, after calcination for 6 hours at 900° C., of at least 35 $m^2/g$.

2. A process according to claim 1, wherein said composition exhibits a specific surface, after calcination for 6 hours at 900° C., of at least 40 $m^2/g$.

3. A process according to claim 2, wherein said composition exhibits a specific surface, after calcination for 6 hours at 900° C., of at least 45 $m^2/g$.

4. A process according to claim 9, wherein the internal combustion engines are operating with a fuel containing at least 30 ppm of sulphur.

5. A process according to claim 4, wherein the internal combustion engines are operating with a fuel containing at least 50 ppm of sulphur.

6. A process according to claim 5, wherein the internal combustion engines are operating with a fuel containing at least 200 ppm of sulphur.

7. A process according to claim 1, wherein the composition is of formula $Ce_xZr_yM_zO_2$, wherein M represents yttrium, lanthanum or praseodymium and wherein z is between 0 and 0.3, x and y presenting a x/y ratio of between 1 and 19, the values of the limits, other than 0, being included and x, y and z being linked by the relationship $x+y+z=1$.

8. A process according to claim 7, wherein z is between 0.02 and 0.02 and the x/y ratio is between 1 and 9, the values of the limits, other than 0, being included and x, y and z being linked by the relationship $x+y+z=1$.

9. A process according to claim 8, wherein z is between 1.5 and 4.

10. A process according to claim 9, wherein z is between 0.02 and 0.2 and the x/y ratio is between 1 and 9, the values of the limits, other than 0, being included and x, y and z being linked by the relationship $x+y+z=1$.

11. A process according to claim 10, wherein z is between 1.5 and 4.

12. A process according to claim 1, wherein said composition is in the form of a solid solution.

13. A process for the catalytic treatment of exhaust gases from internal combustion engines operating with a fuel containing sulphur, comprising the steps of using, as catalyst, a composition comprising a cerium oxide and a zirconium oxide, in a cerium/zirconium atomic proportion of at least 1, said composition further comprising at least one oxide selected from the group consisting of yttrium oxide, lanthanum oxide and praseodymium oxide, and said composition exhibiting a specific surface, after calcination for 6 hours at 1000° C., of at least 14 $m^2/g$.

14. A process according to claim 13, wherein said composition exhibits a specific surface, after calcination for 6 hours at 1000° C., of at least 20 $m^2/g$.

15. A process according to claim 14, wherein said composition exhibits a specific surface, after calcination for 6 hours at 1000° C., of at least 30 $m^2/g$.

16. A process according to claim 13, wherein the internal combustion engines are operating with a fuel containing at least 30 ppm of sulphur.

17. A process according to claim 16, wherein the internal combustion engines are operating with a fuel containing at least 50 ppm of sulphur.

18. A process according to claim 17, wherein the internal combustion engines are operating with a fuel containing at least 200 ppm of sulphur.

19. A process according to claim 13, wherein the composition is of a formula $CE_xZr_yM_zO_2$, wherein M represents yttrium, lanthanum or praseodymium and wherein z is between 0 and 0.3, x and y presenting a x/y ratio of between 1 and 19, the values of the limits, other than 0, being included, and x, y and z being linked by the relationship $x+y+z=1$.

20. A process according to claim 13, wherein said composition is in the form of a solid solution.

21. A catalytic system for the treatment of exhaust gases from internal combustion engines operating with a fuel containing sulphur, comprising a composition comprising a cerium oxide and a zirconium oxide, in a cerium/zirconium atomic proportion of at least 1, said composition further comprising at least one oxide selected from the group consisting of yttrium oxide, lanthanum oxide and praseodymium oxide, and said composition exhibiting a specific surface, after calcination for 6 hours at 900° C., of at least 35 m$^2$/g.

22. A catalytic system according to claim 21, wherein said composition is in the form of a coating on a substrate.

23. A catalytic system for the treatment of exhaust gases from internal combustion engines operating with a fuel containing sulphur, comprising a composition comprising a cerium oxide and a zirconium oxide, in a cerium/zirconium atomic proportion of at least 1, said composition further comprising at least one oxide selected from the group consisting of yttrium oxide, lanthanum oxide and praseodymium oxide, and said composition exhibiting a specific surface, after calcination for 6 hours at 1000° C., of at least 14 m$^2$/g.

24. A catalytic system according to claim 23, wherein said composition is in the form of a coating on a substrate.

\* \* \* \* \*